United States Patent [19]

Mandt

[11] 4,199,452
[45] Apr. 22, 1980

[54] JET AERATION CHANNEL SYSTEM

[75] Inventor: Mikkel G. Mandt, Cedar Falls, Iowa

[73] Assignee: Houdaille Industries, Inc., Ft. Lauderdale, Fla.

[21] Appl. No.: 839,011

[22] Filed: Oct. 3, 1977

[51] Int. Cl.² .............................................. C02C 1/10
[52] U.S. Cl. .................................. 210/104; 210/114; 210/115; 210/129; 210/134; 210/195.3; 210/205
[58] Field of Search ................... 210/195 S, 101, 128, 210/129, 134, 205, 121, 195 SO, 86, 104, 416 R, 114, 115, 112; 137/386; 417/3, 7

[56] References Cited

U.S. PATENT DOCUMENTS

| 3,617,537 | 11/1971 | Vermette | 210/8 |
| 3,840,457 | 10/1974 | Wilson | 210/14 |
| 3,846,292 | 11/1974 | Lecompte, Jr. | 210/60 |
| 3,897,000 | 7/1975 | Mandt | 210/14 |
| 3,905,904 | 9/1975 | Cherne et al. | 210/195 SO |
| 3,990,976 | 11/1976 | Sullins | 210/96 R |
| 3,997,437 | 12/1976 | Prince et al. | 210/4 |

FOREIGN PATENT DOCUMENTS

| 2520397 | 11/1976 | Fed. Rep. of Germany | 210/195 S |
| 2327200 | 5/1977 | France | 210/195 S |

Primary Examiner—Charles N. Hart
Assistant Examiner—David R. Sadowski
Attorney, Agent, or Firm—Fitch, Even & Tabin

[57] ABSTRACT

Activated sludge waste water treatment systems utilizing influent and/or sludge return flow as pressurized gas-liquid contactor motive stream source and having improved energy efficiency. Staged flow control systems are also disclosed.

9 Claims, 7 Drawing Figures

JET AERATION CHANNEL SYSTEM

The present invention relates generally to a waste water treatment system and a method for the treatment of waste water. More particularly, the present invention is directed to aerobic waste water treatment systems having improved energy requirements, which can be adapted to efficiently compensate for diurnal or other variations in sewage flow that are commonly found in medium size sewerage treatment plants.

Systems for the treatment of aqueous wastes may be classified as either aerobic or anaerobic. Anaerobic processes require a long residence time and are accompanied by stagnant conditions. Aerobic processes, in contrast, utilize oxygenation to promote the rapid growth of microorganisms and the concomitant oxidation and consumption of particulate and dissolved effluent waste components. Aerobic processes are relatively rapid in comparison with anaerobic processes and the resulting mass of microorganisms which accumulates to form a sludge is useful for agricultural purposes. Such aerobic systems generally include an inlet for the aqueous waste, a tank of sufficient volume to provide a desired level of retention time, an outlet for the treated liquid, and a method for supplying dissolved oxygen at a level high enough to support microorganism growth and prevent anaerobic conditions from developing. Essential nutrients may be added to the system as required for example in certain industrial wastes to sustain growth of microorganisms.

A number of types of treatment systems utilizing aerobic processes have been devised. In this connection, activated sludge systems in which the microorganism component of an aeration zone effluent is separated and returned to the aeration zone, are particularly desirable treatment systems. Such activated sludge systems may conventionally utilize various types of enhanced aeration zones, such as oxidation ditch aeration channels, complete-mix aeration basins, and plug flow basins. The so called "oxidation ditch" systems such as described in U.S. Pat. No. 3,846,292 to Lecompte, and complete-mix or plug flow basins have achieved substantial utilization in effective aerobic treatment of aqueous wastes.

Activated sludge installations provide some method for keeping the aqueous waste in motion in one or more aeration treatment zones such as complete-mix basins or oxidation channels and for preventing the sludge from settling out. A clarification zone for mixed liquor effluent from the aeration zone, which will generally be a separate clarifier located adjacent the aeration treatment basin is utilized to separate the sludge from the treated liquid. At least a portion of the sludge, which contains the desirable microorganisms, is returned to the aeration treatment zone to enhance the treatment of raw waste influent in the aeration treatment zone.

An oxidation ditch or channel is a type of activated sludge installation wherein the treatment basin forms a continuous, closed course for liquid movement, usually in an oval, race track configuration or a circular configuration. In the oval oxidation channel configuration, the clarifier will generally be located adjacent an outside edge of the aeration basin, while in the circular configuration, the oxidation channel of the aeration zone will generally peripherally surround the clarifier.

In oxidation channel systems, a means is generally provided for introducing oxygen into the liquid in the basin and to move the liquid around the course.

In the oxidation ditch system described in the forementioned Lecompte patent, pumps are used to pick up mixed liquor from within the oxidation channel and to discharge it through a plurality of gas-liquid contactors, such as ejectors, located in the continuous basin. An air-liquid mixture stream which may be provided by gas-liquid contactors provides a motive force for the liquid mass in the continuous basin tending to homogenize the mixed liquor as well as to maintain the mixed liquor in motion around the oxidation channel. The action of the gas-liquid contactors creates a circular movement around the oxidation channel in addition to providing intimate air-liquor contact for effective and efficient introduction of oxygen to the aeration treatment zone. However, such activated sludge treatment systems may use substantial amounts of power in achieving the desired degree of treatment and purification under varying conditions. In this connection, pumping energy may generally be required at a lift station to elevate the influent to be treated to the level of the aeration treatment channel or basin. The amount of lift required may vary depending on influent flow rate, and in any event may represent a relatively small amount of head requirement at a relatively high flow rate which does not most effectively utilize the pumping efficiency capability of conventional sewage pumps. Further energy is required to drive the gas-liquid contactors with respect to providing a motive fluid stream, and in appropriate compressors to supply pressurized air to the contactors for dispersion and introduction into the mixed liquor. Pumping energy may also be required to pump the recycle sludge component from a sludge collection zone or sump of the clarifier, back up to the level of the aeration treatment zone. Such sludge return pumping is generally carried out under high volume, low-head conditions which tend to be relatively inefficient in terms of energy utilization.

An additional complication in the provision of conventional activated sludge waste treatment systems is in the provision of system capability to effectively and efficiently respond to variation in influent flow and Biological Oxygen Demand (BOD). For example, a typical medium-sized sewage treatment facility will be presented with a wide variation of raw sewage influent flow, even over the course of a single day, and the facility should be capable of effectively treating waste influent flow levels substantially in excess of the nominal design capacity of the system. However, the provision for and operation at excess capacity may result in various operational inefficiencies. Moreover, if the amount of aqueous waste to be treated falls below its nominal design capacity, a conventional aeration treatment facility may operate at a power level substantially in excess of that normally required to treat the waste, and excessive power is also consumed under these conditions.

Accordingly, it is an object of the present invention to provide improved aerobic treatment systems which may be adapted to be capable of compensating for variations in the amount of aqueous waste to be treated. It is another object of the present invention to provide an improved aerobic oxidation system which is capable of operation at reduced power requirements when the influent flow of aqueous waste falls below the nominal design influent flow. Other objects and advantages of the invention will become more apparent from the following detailed description and the accompanying drawings, wherein:

The present invention is directed to improvements in aerobic activated sludge treatment systems for waste water such as raw sewage. Such waste water may have an average $BOD_5$ of at least about 100 mg. per liter, generally more, which should be substantially removed by appropriate treatment before return to the environment. In such activated sludge systems of the type utilized herein, the waste water influent is generally introduced into an aeration and treatment retention zone containing a mixed liquor of sludge microorganisms maintained under aerobic conditions for removal of the biological oxygen demand of the mixed liquor. In such systems, and particularly in sewage treatment systems, the waste water influent may originate (e.g., directly or indirectly from subterranean sewage pipes) at a hydrostatic level substantially below the hydrostatic surface level of the mixed liquor in the aeration zone and must be pumped into the aeration zone. A treated mixed liquor effluent is conducted from the aeration zone to a clarification zone for separating sludge microorganisms from the treated mixed liquor effluent to provide a separated sludge component and a clarified treated effluent component. Also in such systems, in order to increase the biological activity of the mixed liquor, at least a portion of the separated sludge component from the clarification zone is returned to the aeration zone in a recyclic manner to concentrate the sludge component in the mixed liquor. Generally, in accordance with conventional practice, the aeration treatment zone will have a volume sufficient to provide a desired hydraulic retention time in the aeration zone adequate for effective treatment. A wide variety of aeration zone and sludge recycling clarification zone systems have been developed in the art and may be utilized with various of the system improvements described herein. In accordance with the present invention, methods and apparatus are provided for introducing the waste water influent into the mixed liquor of the aeration and treatment retention zone as a gas-liquid contactor motive stream for dispersing oxygen in the mixed liquor.

In this connection, such introduction may be accomplished by gas-liquid contacting means for utilizing a pressurized liquid waste water influent source to provide gas-liquid mixing energy to transfer oxygen into the mixed liquor and to mix the aeration zone to maintain the mixed liquor solids in suspension. Examples of gas-liquid contacting means include apparatus specifically or generically termed ejector mixers, impingement aerators, jet aerators, aspirators, venturi mixers, and vortex mixers. Such gas-liquid contacting means may also utilize a pressurized oxygen source, generally air. The gas-liquid contacting means should operate with a liquid waste water influent source pressure of at least about 8 feet of water pressure, and should be capable of providing at least about 0.25 of the oxygen requirement for satisfying the $BOD_5$ of the waste water influent introduced through the gas-liquid contacting means into the aeration zone. Desirably, such methods and apparatus will further include means for pumping the influent directly from a sump zone having an influent level substantially below the surface of the aeration and treatment retention zone, and for providing such influent to the gas-liquid contacting means at a pressure of at least about 8 feet of water. In this connection, the surface level of the raw waste influent in the sump zone will desirably be in the range of from about 20 feet to about 5 feet below the surface level of the mixed liquor in the aeration zone in certain embodiments and will be less than about 5 feet below the mixed liquor in other embodiments. In this manner, the use of a separate conventional lift pumping station for elevating the influent to the aeration and retention zone may be avoided. By combining the pumping requirements for influent lift and pumping requirements for the motive stream of gas-liquid contactor apparatus, the requisite pumping energy may be supplied at an efficient pressure-flow rate relationship which contributes to over-all energy utilization efficiency of the system. Moreover, such influent introduction may be made under optimal aeration energy utilization and under conditions in which the raw influent is rapidly and intimately mixed with oxygen and microorganisms containing mixed liquor.

Conventional low head, high volume sewage pumps of a given capacity have a maximum operating efficiency at a total dynamic head (TDH) in the range of from about 15 feet to about 35 feet of water pressure. By combining the pumping requirements for lifting the waste water, which may hereinafter generally be referred to as sewage or raw waste influent, with the pumping requirements for providing a pressurized fluid source for the gas-liquid contactors, the flow requirements of the system may be pumped at an optimum TDH to provide over all energy utilization efficiency improvement to the system. More specifically, total power input E may be given in horsepower as $$E \simeq \frac{I(h + h_w + h_l)\gamma_l}{33,000\epsilon_p}$$

where I is the influent flow in gallons per minute, h is the static lift in feet (of water) in lifting the influent flow to the level of the mixed liquor in the aeration zone, $h_w$ is the liquid pressure drop in feet across the gas-liquid contacting means, $h_l$ is the liquid line loss in feet between the influent collection point and the gas-liquid contacting means, $\gamma_l$ is the influent specific gravity in pounds per gallon, and $\epsilon_p$ is the pumping means efficiency. As indicated, h is advantageously about 20 feet or less, and $h_w$ will generally be about 8 feet or more. The pumping efficiency $\epsilon_p$ will generally be higher at a head of $(h+h_w)$ than for separate pumping steps or means at respective heads of h and $h_w$.

Further in accordance with various aspects of the invention, a plurality of at least two gas-liquid contacting means and at least two pumping means for providing the influent to the gas-liquid contacting means may be provided which are differently responsive to influent flow rate. By having a plurality of such gas-liquid contactors and respective associated pumping means which operate at a predetermined energy efficiency relationship and which are activated in a staged relationship as a function of increasing influent flow rate, the treatment system is provided with the capability of treating wide variations of influent flow under optimized energy utilization conditions. Furthermore, the flow activation response of the optimized influent pumping and gas-liquid contactor systems may be made responsive to influent flow rate by means of influent level sensing so that over all optimization of system performance over a wide range of treatment flow rate conditions may be substantially achieved by response to the single control parameter of influent level.

A first pumping means associated with a first gas-liquid contacting means for supplying pressurized waste influent thereto is desirably provided which has a pumping capacity of at least about 30 percent of the Average Design Capacity of the system. The first gas-liquid contacting means should have a flow capacity to accommodate the first pump output and should best be capable of operating at an oxygenation capacity efficiency of at least 0.5 of its maximum oxygenation capacity efficiency when provided with an influent flow corresponding to the pumping capacity of the first pump. Additional pumping means and associated gas-liquid contacting means should best have a capacity of at least about 40 percent and preferably about equal to that of the first pump and an oxygenating capacity efficiency for the gas-liquid contactors at the respective influent flows of the associated pump of at least 0.5 of the maximum oxygenating capacity efficiency. Preferably the first pump has a capacity of about the average daily flow of the system.

Further in accordance with the present invention, methods and apparatus may be provided for reintroducing the sludge microorganism recycle flow from the clarification zone to the aeration and retention zone as a gas-liquid contactor motive stream. The sludge recycle flow will generally originate at a hydrostatic level below the level of the aeration and retention zone (generally at least corresponding to the head loss in the clarification and sludge collection zone), and such means will generally comprise pumping means for both lifting the sludge recycle flow component and for providing the pumping energy appropriate to supply the sludge recycle flow as a gas-liquid contactor motive stream under predetermined aeration efficiency conditions. In this manner, the flocculated microorganisms of the recycle sludge flow are subjected to high rate aeration conditions and shear mixing conditions which disperse the flocculated microorganism colonies, and uniformly mix the dispersed sludge microorganisms under high rate aeration conditions with the mixed liquor of the aeration and retention zone. The sludge return pumping means, like the influent pumping means, should provide the sludge return fluid to the sludge return gas-liquid contacting means at a pressure of at least about 8 feet of water and the sludge return gas-liquid contacting means should best have the capacity of operating at at least about 0.5 of its maximum oxygenating capacity efficiency at the sludge return capacity of the pumping means.

In a manner similar to the input energy for the influent pumping, the sludge return recycle input power, E, in horsepower, may be represented as:

$$E \simeq \frac{R(h + h_w + h_1)\gamma_1}{33,000\epsilon_p}$$

where R is the sludge return flow in gallons per minute, h is the static lift in feet in lifting the sludge return flow to the level of the mixed liquor in the aeration zone, $h_w$ is the liquid pressure drop in feet across the gas liquid contacting means used for reintroducing the sludge return flow to the mixed liquor, $h_1$ is the liquid line loss in feet between the sludge collection point and the gas-liquid contacting means, $\epsilon_p$ is the sludge return pump means efficiency and $\gamma_1$ is the sludge return flow specific gravity in pounds per gallon. The static lift $h_1$ will be about 5 feet or less in many clarifier systems, and the combination of the pumping requirement heads h and $h_w$ for the sludge recycle lift and gas-liquid contactor sludge recycle pressurization provides for optimization of $\epsilon_p$ in sewage pump utilization for sludge recycle.

Because both the sludge recycle flow and the influent flow may be introduced into the aeration and retention zone as a gas-liquid contactor motive stream, the influent and the sludge recycle flow may be combined prior to such introduction in a suitable location such as an influent sump zone. Such combination of influent may best be utilized in systems in which the influent lift is about 5 feet or less so that an unnecessary increment in sludge return head loss will not result, or at system influent input rates which require relatively small treatment plant capacity such about 1 million gallons per day or less. In such configurations, the pumping means will lift and pump a combined influent-sludge return flow as a pressurized source to its associated gas-liquid contacting means.

However, in part because the hydrostatic level difference between the sludge recycle component and the aeration zone will usually tend to be less than the hydrostatic level difference between the influent and the aeration zone, it is desirable to provide separate pumping and gas-liquid contacting means for the sludge recycle flow component. The sludge recycle pump and gas-liquid contacting means may be operated at a relatively constant recycle rate of flow such as provided by certain clarifier designs or may be made responsive to influent flow rate. A plurality of at least two such pumping and gas-liquid contacting means may be provided for the sludge recycle component in systems which are responsive to influent flow rate in a manner analogous to that described with respect to raw influent flow.

Figure 1:
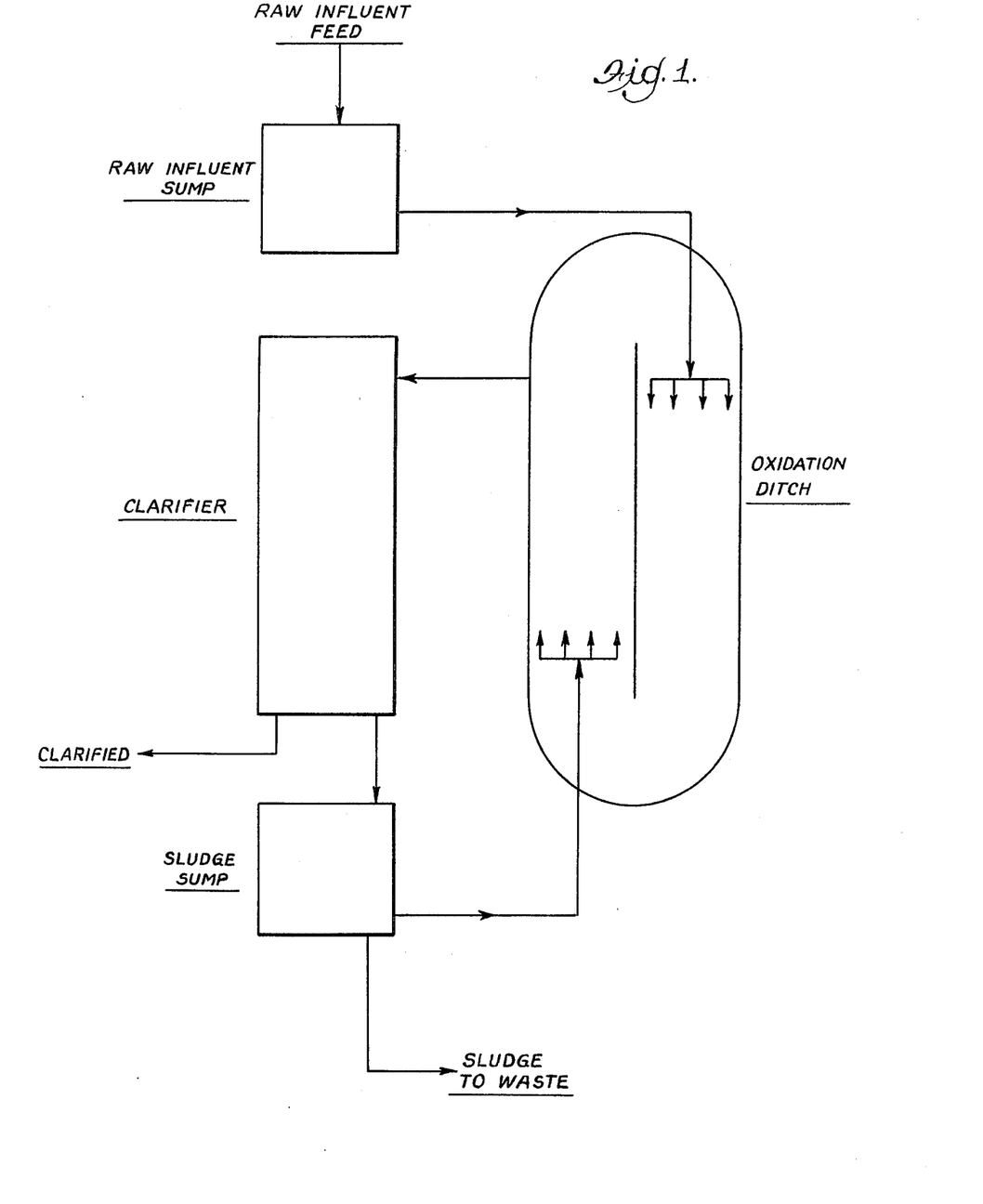
FIG. 1 is a schematic flow diagram of an embodiment of an oxidation channel system in accordance with the present invention.

Turning now to the drawings, various aspects of the invention will now be further described with respect to the embodiment of sewage treatment apparatus 10 of the oxidation channel type which is illustrated in FIGS. 1–6. FIG. 1 of the drawings illustrates the flow scheme of the apparatus 10, and as indicated there, the raw influent is injected directly into an aeration and treatment retention zone in the form of an oxidation channel through a gas-liquid contactor means. Similarly, the recycled sludge is injected directly into the oxidation channel by means of a gas-liquid contactor. Thus, under normal operating conditions, substantially all of the raw influent and substantially all of the flocculated sludge return are provided as a pressurized fluid which is directly introduced into the mixed liquor under relatively intense aeration and mixing conditions. Moreover, the raw influent and/or recycled sludge provides the motive power for movement of the aqueous waste in the oxidation channel. In accordance with conventional practice, the oxidation channel will desirably have a design volume of at least about 0.1 and more preferably from about 0.5 to about 1.0 of the sewage design flow to be treated, to provide an average retention time of at least about 2.4 hours, and preferably from about 12 hours to about 24 hours with respect to the design flow capacity of the system. By average design flow is meant the total average daily design flow of raw waste influent to the system.

From the oxidation channel the treated liquid is sent to a clarifier where the sludge is recovered. The sludge is collected in a sludge sump and is returned to the oxidation channel as the motive stream for a separate gas-liquid contactor which also supplies motive power for the mixed liquor in the oxidation channel in a direction complimentary to that of the influent gas-liquid contactors. As will be discussed, either the influent or the sludge gas-liquid contacting system may be used as the sole source of motive power for moving the mixed liquor in the oxidation channel.

Recovered sludge is removed from the sludge sump, and may be wasted as required in accordance with conventional practice. The clarified liquid effluent may be subjected to subsequent treatment steps, and released to a stream or other body of water in a relatively pure condition. The amount of sludge recycle may vary between 25 percent and 150 percent by volume of the incoming raw waste and preferably varies within the range of from 50 to 110 percent.

Referring now to FIGS. 2 through 6, the operation of the oxidation channel system 10 will be described in greater detail. The channel 11 is a tank provided with a baffle wall 13 and semi-circular end baffles 15 and 16 to define a continuous substantially closed course for liquid movement. In accordance with conventional design, the channel has a depth of at least about 5 feet and preferably has a depth of from about 10 to about 20 feet or more. The channel is constructed of a material suitable for continuous contact with aqueous waste systems, such as reinforced concrete or lined metal.

Figure 2:
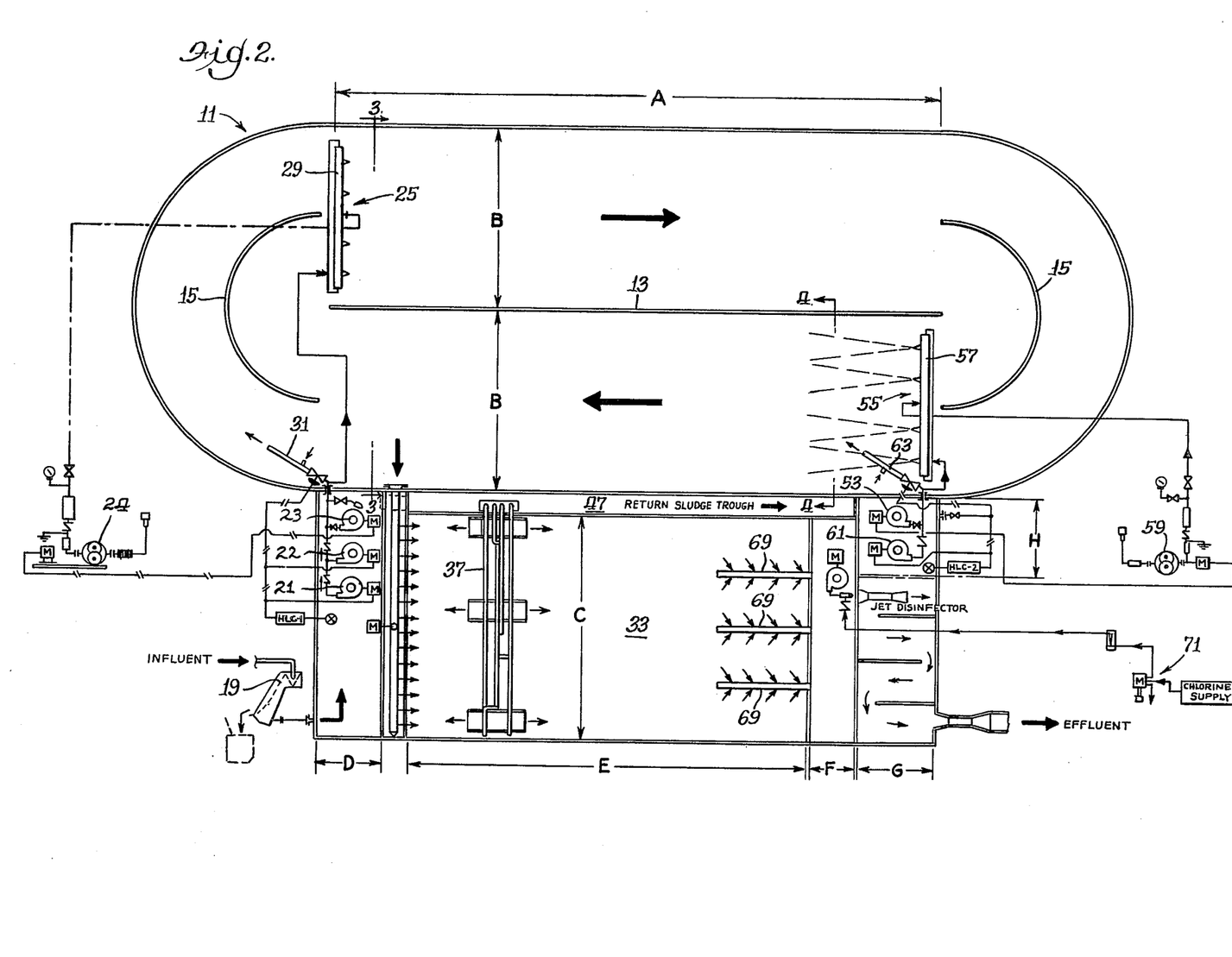
FIG. 2 illustrates a plan view of an embodiment of an oxidation channel system suitable for use in the system of FIG. 1.

A preferred configuration for channel 11, as illustrated in FIG. 2, is an oval shaped tank having baffle wall 13 and semi-circular end walls 15 and 16 to provide a race tracked channel. The liquid flow path is around the channel and is free from obstructions other than those presented by the equipment used. Various dimensions of the oxidation channel system of the present invention have been designated by the letters A through H in FIG. 2. Illustrative sides for various design flow rates are presented hereinbelow.

Raw waste is introduced into raw waste influent sump 17. The illustrative sump 17 is a rectangular chamber adapted to accommodate the maximum designed raw waste influent flow. Prior to entry into raw waste sump 17 the raw waste may be passed through an influent strainer 19 to remove bulk solids. The raw waste sump 17 serves the dual function of acting as a surge tank to equalize variable influent flow rates and as a lift station for introduction of raw waste into oxidation channel 11.

The raw waste sump 17 is provided with a plurality of sewage pumps comprising a first pump 21 and a second pump 23 (a standby pump 22 is also shown). The pumps are conventional sewage pumps and may be submersible types or may be surface mounted with appropriate lift characteristics. The pumps 21 and 23 are actuated by liquid level controls (not shown) which sense the hydrostatic level in raw waste influent sump 17. The liquid level controls may be simple switches mounted at different heights in the sump 17 which are activated when the liquid level reaches their respective mounting locations. The level controls for the respective pumps will activate at different hydrostatic levels in the sump 17, and pump control will desirably become deactivated at a predetermined level below its respective activation points. The first pump 21 is actuated when a predetermined level of raw waste has been introduced into the sump 17. The second pump 23 is actuated when the raw waste reaches a predetermined level higher than that which actuated the first pump 21. In this manner, the activation and operation of the pumps is made responsive to the influent flow rate.

Both pumps 21 and 23 pump raw waste directly to a gas-liquid contactor 25 comprising a plurality of pressurized air jet aerators. The jet aerators are mounted on a common manifold 27. Any suitable number of jet aerators can be mounted on the manifold 27. As shown in FIG. 2, four jet aerators are mounted on manifold 27. The jet aerators are provided with air from blower 29 which is an appropriate size to provide the required amount of air. A second blower (not shown) may also be provided for supplying additional air to the aerators 25 under high influent flow conditions and may be actuated upon activation of the second influent pump 23. The illustrated jet aerators are model 200 JA aerators of the Pentech Division of Houdaille Industries, Inc. Each jet aerator includes a housing having a waste liquid inlet for receiving a stream of pressurized waste liquid, a high velocity waste liquid nozzle in communication with the waste liquid inlet, an air inlet for receiving air, a mixing chamber in communication with the waste liquid nozzle and air inlet and a discharge outlet for discharging a relatively high velocity waste liquid-air jet. Although specific gas-liquid contactors of the jet aerator type are illustrated to receive the discharge stream from first pump 21, it will be appreciated that other types of gas-liquid contactors may be utilized. In this connection, the gas-liquid contactors provide a mass transfer process whereby an oxygen-containing gas (generally, air) is intimately dispersed in the mixed liquor under turbulent conditions provided (at least in part) by the energy of a motive stream from the raw sewage and/or return sludge. Gas-liquid contactors in which an air entrained mixture of a motive fluid jet of the raw sewage effluent and/or sludge recycle flow is discharged into the aeration and retention zone with a velocity of at least about 10 feet/second are preferred. The gas-liquid contactor should best have the capacity for providing at least about 0.02 pounds of dissolved oxygen to the mixed liquor per gallon of waste influent and/or sludge return motive stream and preferably at least about 0.04 pounds. Moreover, the gas liquid contactor should be capable of operating in the aeration zone at an oxygenation efficiency of at least about 2 pounds of dissolved oxygen per horsepower-hour of energy supplied to the gas-liquid contactor, and preferably at least about 3 pounds per hp-hour. In such systems, power is conventionally supplied as motive stream and air input pressure to the gas-liquid contactor, and the oxygenating capacity may be maximized for jet aerators at a particular air-liquid input power ratio.

In the illustrated embodiment, the bank of jet aerators may be of a type described in U.S. Pat. No. 3,897,000, which provides the initial inlet of raw waste into the oxidation channel 11 from the first raw waste pump 21, which thus serves the dual function of introducing the raw waste to the treatment plant and powering the oxidation channel aeration unit. The raw sewerage sump 17 is also designed to be capable of handling return sludge from the secondary clarifier, as will be described more fully hereinafter.

The second raw waste pump 23 is piped in parallel with the primary raw waste pump 21. When the liquid level in the sump reaches a predetermined high level, the second pump 23 is activated by its respective sump liquid level control. Simultaneously a control valve in a second influent gas-liquid contactor, which in the illustrated embodiment is a standby surface aspirator 31, opens to provide addition oxygenation capacity and flow handling capacity under predetermined oxygenation efficiency conditions. The second blower previously mentioned may also be activated to provide additional oxygenation, with the compressed air power levels at one and two blower operation being selected to bracket the maximum air-liquid input power ratio at maximum efficiency. The design pumping capacity during high level mode operation is from two to three times the nominal operating design pumping capacity as will be more fully explained hereinafter. As the level in the raw sewage sump 17 subsides, the second pump 23 and the control valve for the aspirator 31 are shut down. During very low flow conditions, the primary pump can also be shut down by means of a low level control. The low level control also shuts down the blower 29 and the oxidation channel is powered by sludge pumps as described hereinafter. The illustrated aspirator 31 is a gas-liquid contactor which utilizes a motive stream of raw sewage influent to aspirate, or entrain, air to provide a mixed air-influent jet stream which is introduced into the mixed liquor of the oxidation channel below the surface of the mixed liquor and in a direction which reinforces the flow direction imparted by the gas-liquid contactor 25. Thus, while the aerators 25 are designed to operate with introduction of pressurized air in combination with the motive stream, the gas-liquid contactor 31 aspirates air into the motive stream and thus need not be supplied with pressurized air. Suitable gas-liquid contactors of the aspiration type are described in U.S. Pat. No. 3,840,457 and are supplied by the Pentech Division of Houdaille Industries, Inc.

Although the illustrated gas-liquid contactors 25, 31 are of different types, it will be appreciated that similar or identical gas-liquid contactors may be provided for staged aeration purposes. However, it is a desirable feature of the present invention that gas-liquid contactors which are not used as often during the duty cycle of the system may be of a less expensive type in terms of capital cost to maximize the over-all cost efficiency of the system.

Figure 3:
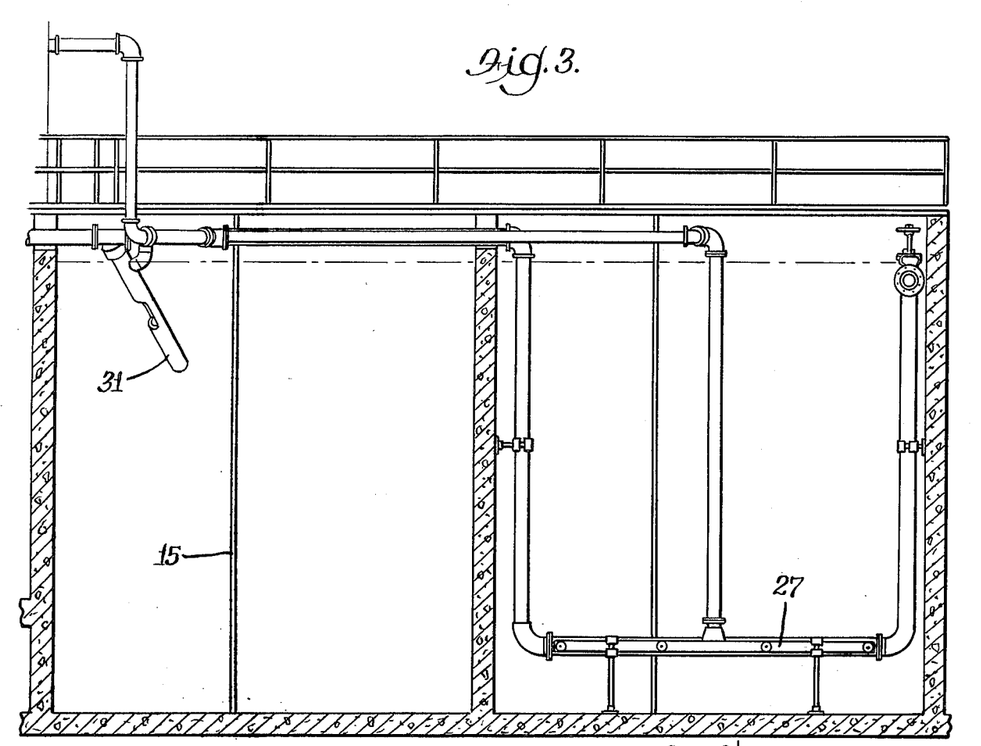
FIG. 3 is a cross-sectional view of a portion of the oxidation channel of FIG. 2 taken along line 3—3 of FIG. 2.

The vertical orientation of the bank of aerators 25 is shown in FIG. 3. The particular depth at which aerators 25 are submerged within the mixed liquor is not critical as long as they are sufficiently below the surface to provide for a reasonable degree of oxygenation efficiency, as oxygenation efficiency increases with ejector depth in accordance with conventional practice. In general, it is preferable that the aerators 25 be placed at or near the bottom of the oxidation channel 11, most preferably no greater than for example, 36 inches from the bottom.

A portion of the mixed liquor is passed into clarifier 33 through opening 35 adjacent the surface of the mixed liquor.

Figure 4:
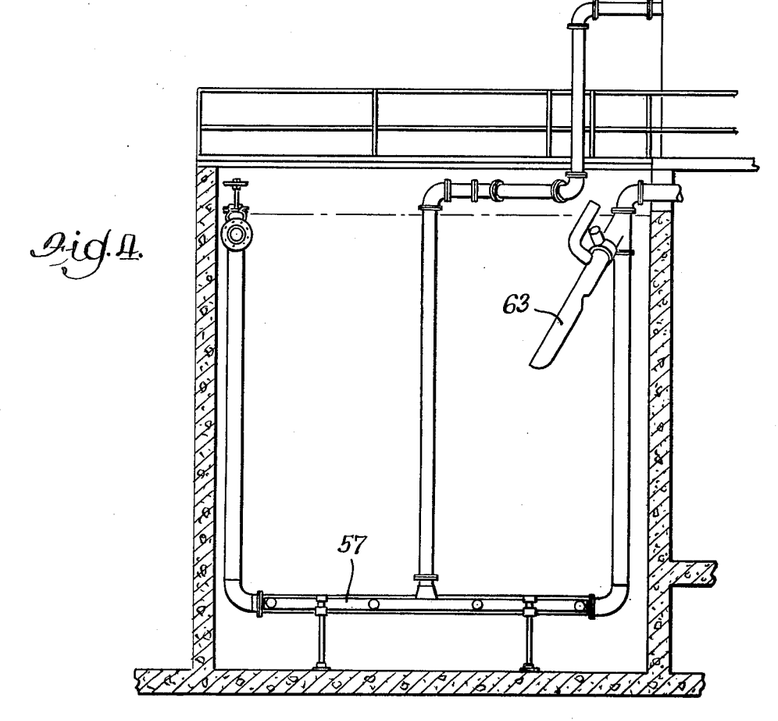
FIG. 4 is a cross-sectional view of a portion of the oxidation channel of FIG. 2 taken along line 4—4 of FIG. 2.
Figure 5:
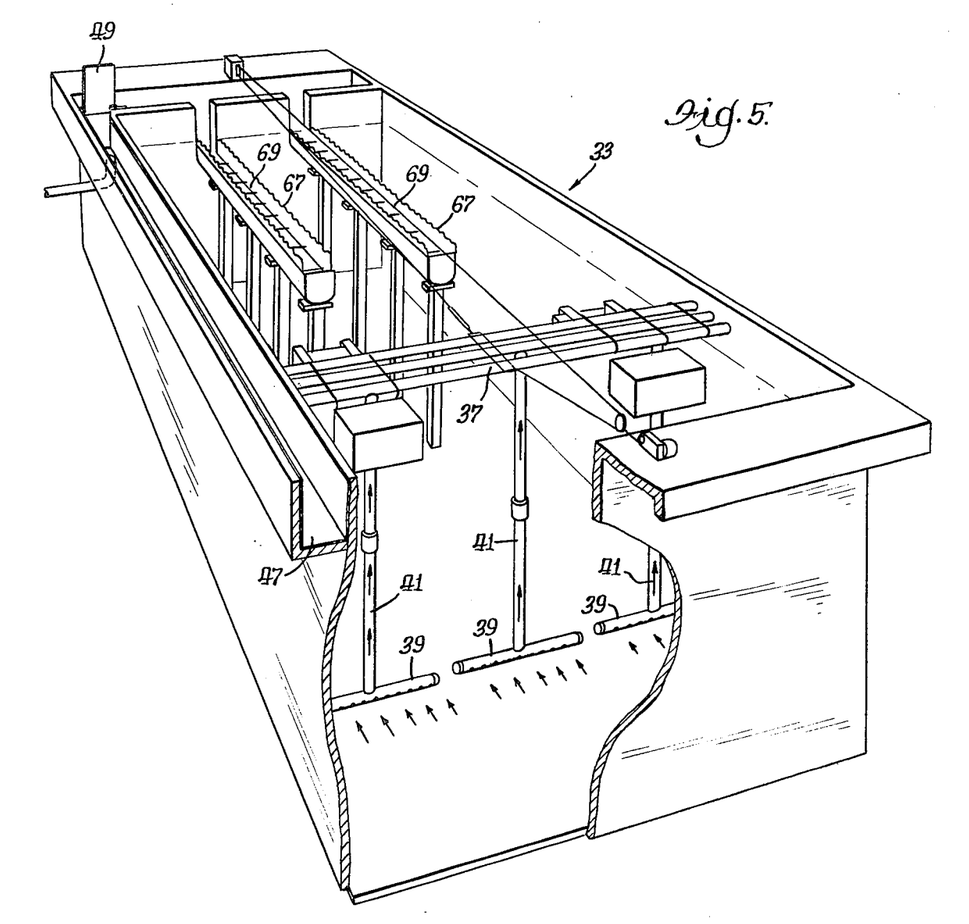
FIG. 5 is an isometric view, partially broken away, of the clarifier portion of the system of FIG. 2.
Figure 6:
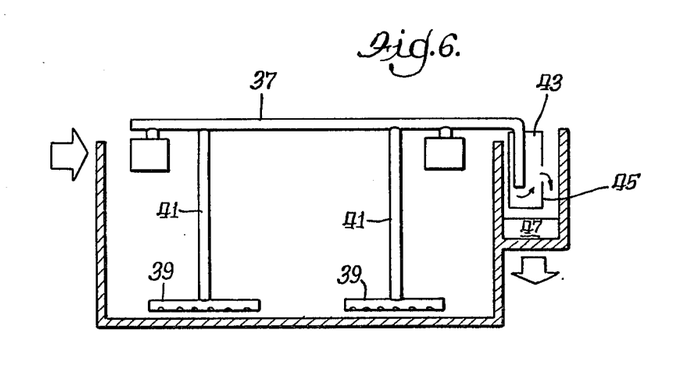
FIG. 6 is a schematic plan view of a cross-section of the clarifier of FIG. 5.

The flow rate of the mixed liquor which passes from oxidation channel 11 into clarifier 33 under equilibrium conditions of flow will generally correspond to the influent flow rate plus the sludge recycle rate. The clarifier 33 may be of conventional design and is described herein in detail for completeness. The clarifier 33 provides a quiescent zone for flocculation and sedimentation of the sludge microorganism and is provided with means for recovering the settled sludge, comprising a travelling sludge pickup header 37. As best seen in FIG. 4, the sludge pickup header is of the floating siphon type. Intake tubes 39 are located adjacent the bottom of the clarifier 33. The intake tubes 39 are provided with suitably sized openings of settled sludge adjacent the bottom of the clarifier. The sludge rich effluent passes upwardly by siphon effect through header tubes 41 and into weir box 43. Weir plate 45 is provided to maintain the siphon.

The sludge rich effluent passes into sludge trough 47. A sluice gate 49 is provided at the edge of sludge trough 47 for admission of sludge into sludge sump 51, which will have a liquid level below that of the surface of the oxidation channel. The sludge is picked up from the sludge sump by a primary sludge pump 53 which is activated at a predetermined level by a level controlled (not shown) in a manner similar to that described for control of first influent pump 21. The first sludge pump 53 powers a gas-liquid contactor comprising a bank of aerators 55 to which the sludge recycle flow from the pump 53 is supplied as the motive stream. The bank of aerators 55 are similar in design and construction to the bank of aerators 25 previously described. That is, a manifold 57 supplies individual aerators with recycle sludge motive fluid. A blower 59 is used to provide a predetermined level of compressed air to the ejectors in a manner also like that of gas-liquid contactor 25. The ejector bank 55 is also used in a manner similar to the ejector bank 25 to power the oxidation channel 11, in that the momentum of the fluid discharge contributes to the momentum of the mixed liquor in the oxidation channel.

When the liquid level in the sludge sump reaches a predetermined high level higher than that which activates pump 53, a second pump 61 is activated. Simultaneously, a control valve in a second recycle sludge gas-liquid contactor comprising a standby surface aspirator 63 like that used with second influent pump 23 opens to provide additional oxygenation capacity and flow handling capacity. When both sludge sump pumps 53 and 61 are in operation, the sludge recycle rate of the illustrated embodiment is in excess of 200 percent of nominal design capacity. Thus, the sludge recycle pumps serve the dual function of lifting the sludge and powering the gas-liquid contactors 55, 63. The addition of the sump lift head to the gas-liquid contactor head provides for an over-all increase in energy efficiency for both the influent introduction and sludge recycle operations.

The first sludge pump and blower 59 associated with the first sludge recycle gas-liquid contactor 55 may be set to operate at all times except when the sludge volume falls below a predetermined level. It is thus possible under low conditions to operate with one sludge recycle pump and gas-liquid contactor, thus minimizing power draw.

Under very low influent flow conditions, the sludge can be returned to raw waste sump 17 by means of a passage 60 from sludge trough 47, which is normally closed except under very low flow conditions. This permits operation of the system without use of the sludge pump 51 under such low flow conditions. In this mode of operation a single raw waste pump 21 (or 23) and associated gas-liquid contactor can be used to power the entire system with associated blower 59 and all other pumps and blowers can be secured.

attention, insensitivity to climate, low power requirement, low sludge yield, low space requirement and the ability to handle and adequately treat up to 2.5 times the nominal design flow.

Furthermore, the system design has the capability of being readily scaled in size to provide systems with different nominal design capacity.

The following table illustrates various design features of various sizes of oxidation channel systems prepared in accordance with the present invention.

TABLE I

| | Dimensions, Ft. | | | | | | | | Equipment and Operation Characteristics at Design Flow | | | | | | Design BOD₅ |
|---|---|---|---|---|---|---|---|---|---|---|---|---|---|---|---|
| Design Flow, MGD | A | B | C | D | E | F | G | H | Blowers* SCFM | Blowers* PSIG | Pump BHP | Blower BHP | Total BHP | O.C.** LB/BHP/Hr | Capacity Lbs/Day |
| 0.5 | 68 | 18 | 22 | 5 | 57 | 3 | 6 | 6 | 80 | 8.2 | 8.5 | 19 | 27.5 | 3.12 | 850 |
| 0.75 | 102 | 19 | 22 | 7.5 | 86 | 3 | 9 | 6 | 120 | 8.2 | 13.6 | 28 | 41.6 | 3.12 | 1275 |
| 1.0 | 136 | 20 | 22 | 10 | 114 | 3 | 12 | 6 | 160 | 8.2 | 15.4 | 30 | 45.4 | 3.74 | 1700 |
| 2.0 | 270 | 22 | 22 | 20 | 226 | 3.5 | 24 | 6 | 310 | 8.1 | 27.1 | 66 | 93.1 | 3.67 | 3400 |
| 3.0 | 290 | 30 | 31 | 22 | 242 | 3 | 26 | 9 | 480 | 8.2 | 42 | 87 | 129 | 4.01 | 5100 |
| 4.0 | 272 | 40 | 44 | 20 | 228 | 5 | 24 | 12 | 640 | 8.2 | 54.2 | 118 | 172.2 | 4.01 | 6800 |
| 5.0 | 256 | 50 | 59 | 20 | 213 | 5 | 23 | 16 | 782 | 8.1 | 54.2 | 140 | 194.2 | 4.40 | 8500 |

*Four required, each at listed ratings.
**Oxygenating capacity, pounds of oxygen
Note:
All dimensions are inside dimensions. Add 1.0' wall thickness.

Waste sludge can be periodically or continuously drawn from the sludge pump by means of waste sludge valve 65 to provide for sludge wasting in accordance with conventional practice. A second blower (not shown) may be used with the aerator 55 under high recycle flow conditions in a manner analogous to that previously described for influent aerator 25.

Clarified effluent is withdrawn from the clarifier 33 by means of effluent weir 67. The effluent passes through effluent trough 69. An effluent treatment station 71 is provided whereby the effluent can be chlorinated in accordance with known procedure such as described in U.S. Pat. No. 4,019,983 if desired. Chlorination procedures are well known and are not described with particularity herein.

The illustrated oxidation channel 11 is designed to be an extended aeration activated sludge system. The hydraulic retention time is at least about 24 hours. Solids retention time is approximately 20 days. High mixed liquor levels are carried in the oxidation channel 11 and dissolved oxygen can be controlled between about 1.0 and 1.5 mg/l if nitrification is to be discouraged or can be greater than 2.0 mg/l if nitrification is to be encouraged. The oxidation channel system provides a unique combination of plug flow and energy optimized complete oxygen/waste mixing which provides immediate feed stream dispersion and metering into the mixed liquor, yet prevents immediate bleed through of the raw waste to the effluent. In this connection, at least about one circulation of the channel is required prior to any fraction of the raw waste being drawn off into the secondary clarifier. Furthermore, because the sludge recycle input is located at least about one half transit circulation from the clarifier input location, opportunity for reflocculation of the thoroughly dispersed recycle sludge is provided.

The oxidation channel is capable of handling highly variable flow rates under a diversity of geographic and climatic conditions, and has high removal efficiency of BOD₅, COD and suspended solids, minimum operating As indicated, the system 10 has the capability to handle a wide variation in influent flow at optimized efficiency. Further in this connection, reference is made to FIG. 7, which is a graphical representation of typical diurnal influent variation to a medium sized sewage treatment facility. The flow is shown as a percent of the average influent flow over the 24 hour period, with the average flow rate corresponding to the nominal design capacity of the system, which in turn corresponds to the pumping capacity of the first influent pump 21 at a lift corresponding to the initial activation level of the pump 21 in the sump 17. For the illustrated system with a nominal design capacity of one million gallons per day, the various pumps and blowers consume energy approximately as follows; including motor inefficiency;

RAW WASTE INFLUENT STATION 2 pumps require 6.7 wire kw for each when running
2 blowers require 6.2 wire kw each when running

SLUDGE RETURN STATION 2 pumps requite 6.7 wire kw each when running
2 blowers require 6.2 wire kw each when running In operation, one pummp at the sludge return station is set to run continuously (24 hours per day) providing base channel mixing energy and constant sludge recycle to keep the clarifier free of sludge build up and odor, and to provide continuous autooxidation of sludge (aerobic digestion within the channel). This represents the base energy input to the system. In this mode of operation, the sludge recycle rate is relatively invariant, as provided by siphon effect of the particular clarifier used. The other components are operated as follows:

One sludge return blower on timer operation
Two influent pumps of respective level control
One influent station blower on low level control
  (simultaneous operation with low level influent pump)

One influent station blower and one sludge return station blower, both tied to high level lift pump.

The bottom of the raw waste influent sump is taken to be at an elevation of 0 feet, and on filling the low level pump is set to activate at +4 feed elevation and to turn off when the sump is pumped down to +2 feed elevation. The high level pump activates at +6 feet elevation, and pumps down with the low level pumps to +2 feet elevation, at which point both the high level pump and the low level pump are turned off by their respective level controls.

Figure 7:
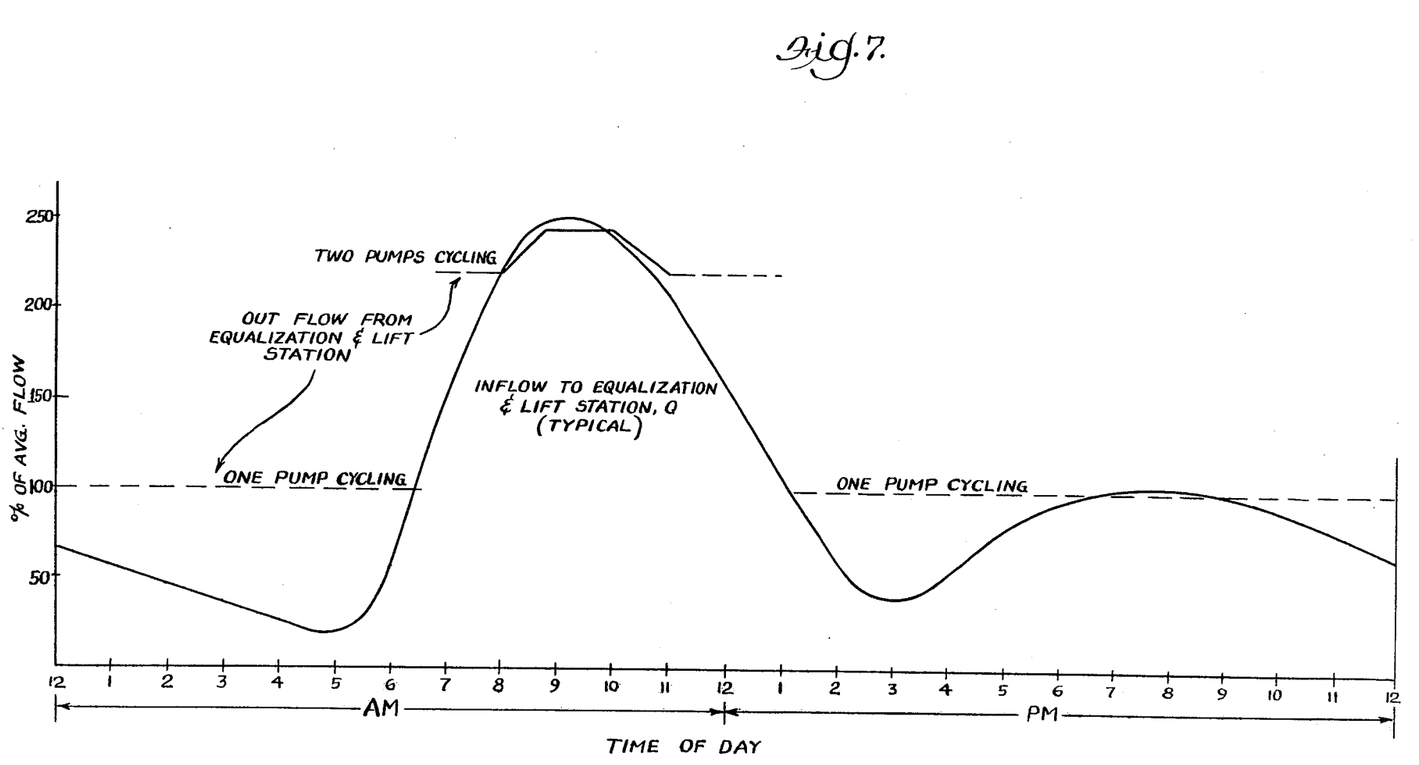
FIG. 7 is a graph illustrating a typical diurnal flow variation of influent to the system of FIGS. 1-6.

From FIG. 7, it will be seen that the low level influent pump operates about 16.12 hours during the 24 hour day, with cyclic operation during times (such as midnight to 6 a.m.) when the influent flow rate is less than the pump capacity. At times (such as from about 7 a.m. to about 8 a.m.) when the influent flow rate is more than one pump capacity, the two pumps will cycle, it being appreciated that due to decrease in lift requirement with increasing sump level, the total pumping capacity will be more than twice the capacity of the individual pumps pumping from the two foot level. The system can accomodate for a short period of time influent flows greater than the two pump capacity (e.g., at 9 a.m.), when both pumps run continuously and the system levels increase.

At the sludge return station, as indicated previously, the first, low level sludge return pump is set to run the entire day, while the associated first sludge return blower may be set to operate 18 hours per day plus an amount of time based on experience or dissolved oxygen measurements to provide a desired degree of dissolved oxygen in the channel at low influent conditions.

For example, at influent flow rates of less than 40 percent of the nominal design flow, the first sludge return blower could be turned on by timer operation for 20 minutes during each hour, so that the total operational time for the blower would be about 20 hours. The second level sludge return blower and the second level sludge return pump run substantially simultaneously with the high level influent pump, which (from FIG. 7) may be seen to run about 5.3 hours during the day. The second sludge return pump serves only as standby pump in this configuration. Thus, the total daily energy utilization may be approximately represented as follows:

|  | hours | × | kilowatts | = | kilowatt hours |
|---|---|---|---|---|---|
| low level sludge return pump | 24 |  | 6.7 |  | 160.8 |
| low level sludge return blower | 20 |  | 6.2 |  | 124.0 |
| low level influent pump | 16.1 |  | 6.7 |  | 107.9 |
| low level influent blower | 16.1 |  | 6.2 |  | 99.8 |
| high level influent pump | 5.3 |  | 6.7 |  | 35.5 |
| high level influent blower | 5.3 |  | 6.2 |  | 32.8 |
| high level sludge return blower | 5.3 |  | 6.2 |  | 32.8 |
| Total |  |  |  |  | 593.6 |

Accordingly, it will be seen that the illustrated system may operate at an average draw of 25 kilowatt hours (593.6÷24) which represents a relatively low power consumption rate with respect to operation without staged flow control system. The corresponding average hourly kilowatt draw without the staged flow control system would be about 38 kw (from Table 1, assuming 90% motor efficiency).

While the invention has been described with reference to specific embodiments of an oxidation channel system, and specific embodiments of gas-liquid contactors, it will be appreciated that various modifications and adaptations will be apparent based on the present disclosure. In this connection, other types of gas-liquid contactors, and aeration and retention zones with associated clarifiers may be utilized such as circular oxidation channels with a centrally located clarifiers, and complete mix or plug flow aeration basins. Other types of clarifiers such as those utilizing direct coupling of return sludge pumps to sludge collectors may be utilized, and such systems may use staged sludge return flows directly or indirectly coupled with influent flow rate.

Furthermore, the systems described herein may readily by utilized with appropriate sensors such as hydrostatic pressure sensors and oxygen sensors, under micropressor control for further system optimization. Such variations and adaptations are intended to be within the scope of the present invention in its broader aspects.

Various of the features of the invention are set forth in the following claims.

What is claimed is:

1. An aerobic system for treating aqueous waste liquid comprising an oxidation ditch for confining and retaining the waste liquid and defining a continuous closed flow path through which the confined liquid is moved, a raw waste sump for receiving influent raw waste to be treated in said oxidation ditch, a first raw waste pump activated by an intermediate level of raw waste received in said raw waste sump, a second raw waste pump activated by a high level of raw waste in said raw waste sump which is higher than said intermediate raw waste sump level, a first blower activated during operation of either said first or said second raw waste pumps, a plurality of gas-liquid contactors for receiving raw waste from either or both of said raw waste pumps and air from said first blower and for discharging a high velocity raw waste liquid-air jet or mixed liquor into said oxidation ditch below the surface of said confined liquid in said oxidation ditch, a clarifier in liquid communication with said oxidation ditch for receiving mixed liquor from said oxidation ditch and for receiving sludge from said mixed liquor, a sludge sump for receiving sludge recovered from said clarifier, a first sludge pump activated by an intermediate level of sludge received in said sludge sump, a second sludge pump activated by a high level of sludge received in said sludge sump which is higher than said intermediate sludge sump level, a second blower activated during operation of either said first or said second sludge pump and a plurality of gas-liquid contactors for receiving said sludge from either or both of said sludge pumps and air from said second blower and for discharging a high velocity sludge-air jet into said oxidation ditch below the surface of said confined liquid in said oxidation ditch.

2. An aerobic activated sludge sewage treatment system comprising
means defining a mixed liquor oxidation and hydraulic retention zone,
gas liquid contactor means for utilizing a motive fluid stream in supplying oxygen to mixed liquor in said oxidation zone as a liquid-gas jet introduced below the surface of said mixed liquor, clarifier means for separating sludge from treated mixed liquor effluent from said mixed liquor oxidation and hydraulic retention zone, and for providing a clarified effluent, pump means for lifting raw waste influent to the level of the oxidation zone and for providing said influent as a pressurized motive stream for said gas liquid contactor means comprising a first pump which is activated at a predetermined first level of influent flow and a second pump which is activated at a predetermined second level of influent flow which is higher than said first influent flow level, and means for introducing sludge return flow from said clarifier as a motive stream to said gas-liquid contacting means.

3. A sewage treatment system in accordance with claim 2 where said gas-liquid contacting means comprises at least one jet aerator associated with said first pump, and at least one jet aerator assigned with said second pump.

4. A sewage treatment system in accordance with claim 2 wherein said sludge return flow introducing means comprises pump means for providing said sludge return flow as a pressurized motive stream to said gas-liquid contactor means.

5. A sewage treatment system in accordance with claim 2 wherein said gas-liquid contactor means comprises at least one separate influent gas-liquid contactor for receiving a pressurized motive fluid stream of said raw waste influent from said raw waste pump means, and at least one separate sludge return gas liquid contactor for receiving a pressurized motive fluid sludge return stream from said pump means for providing said sludge return flow.

6. In an aerobic activated sludge treatment system comprising an oxidation basin for mixed liquor and a clarifier for receiving mixed liquor from said oxidation basin and for separating sludge from mixed liquor received from said oxidation basin to provide a clarified effluent flow and a return sludge, the improvement comprising a first gas-liquid contactor disposed in said basin below the surface of said mixed liquor for disposing oxygen in said mixed liquor, means for supplying pressurized oxygen-containing gas to said first-gas liquid contactor, and a first pumping means for lifting waste influent to the mixed liquor level of said oxidation basin and for supplying said influent under pressure to said first gas-liquid contactor, and at least one additional pumping means for lifting waste influent to the mixed liquor level of said oxidation basin and for supplying said influent under pressure to a gas liquid contactor, and at least one additional gas-liquid contactor for receiving said influent under pressure from said additional pumping means and for dispersing oxygen in said mixed liquor, and means for activating and deactivating said first and said additional pumping means in staged relationship in response to influent flow.

7. A sewage treatment system in accordance with claim 2 wherein said first pump is a low head, high volume sewage pump having a maximum operating efficiency at a total dynamic head in the range of from about 15 feet to about 35 feet of water pressure, wherein said first pump lifts said raw waste influent from a sump zone having an influent surface level in the range of from about 20 to about 5 feet below the surface of said mixed liquor in said oxidation and retention zone, and wherein said first pump provides raw waste influent pumped from said pump zone to said gas-liquid contactor means at a pressure of at least about 8 feet of water.

8. A sewage treatment system in accordance with claim 7 wherein said first pump has a pumping capacity of at least about 30 percent of the average design capacity of the system for raw waste influent treatment, and wherein said second pump has a pumping capacity of at least about 40 percent of the pumping capacity of said first pump.

9. A sewage treatment system in accordance with claim 8 wherein said gas-liquid contactor means is adapted to provide at least about 0.04 pounds of dissolved oxygen to the mixed liquor in said oxidation and retention zone per gallon of said motive fluid stream supplied to said gas-liquid contactor means.

* * * * *